Feb. 9, 1937. F. E. RICE 2,070,412
TAP
Filed June 15, 1935
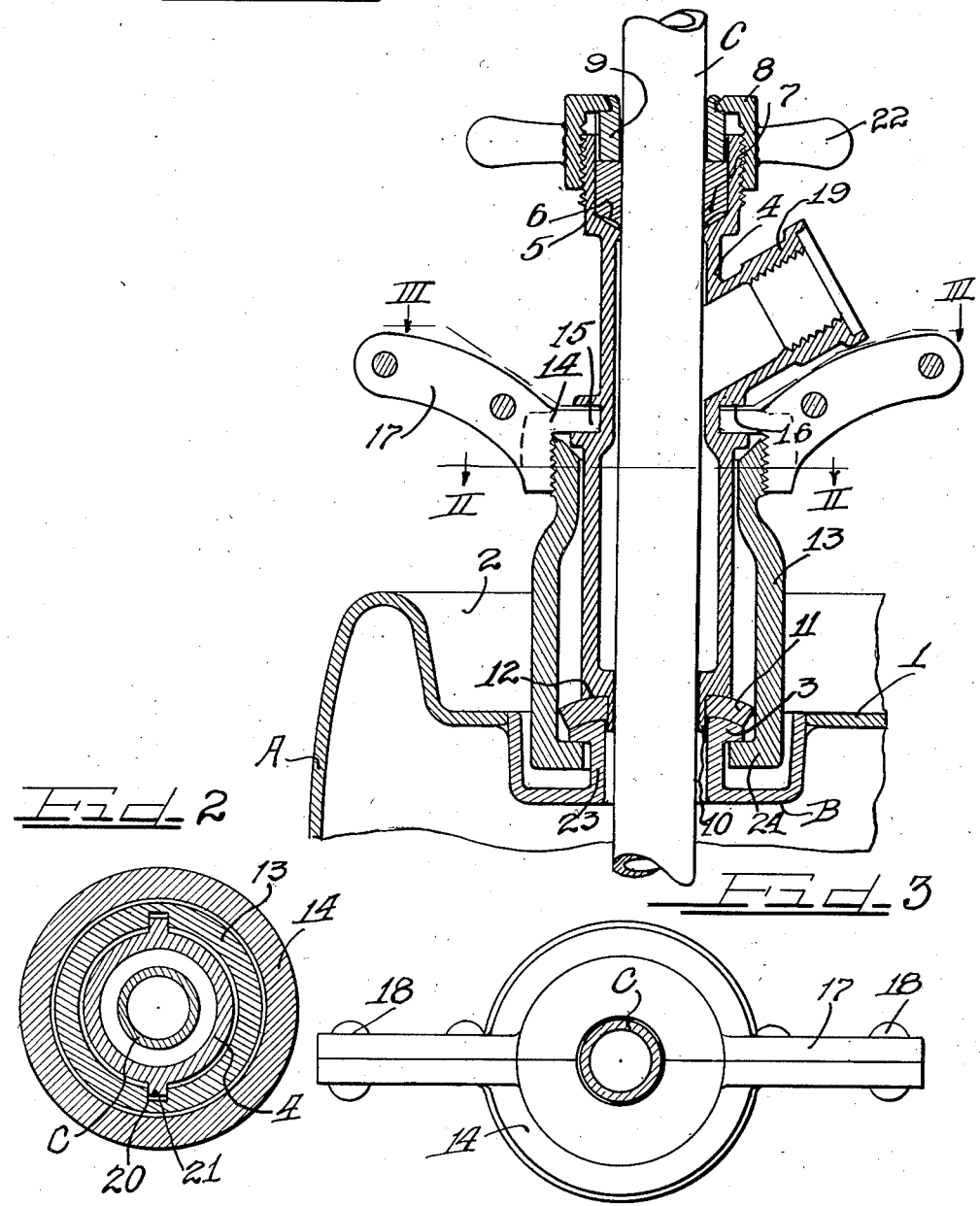
Inventor
Frank E. Rice Patented Feb. 9, 1937

2,070,412

UNITED STATES PATENT OFFICE 2,070,412

TAP

Frank E. Rice, Detroit, Mich., assignor to American Tap-Bush Company, Detroit, Mich., a corporation of Delaware Application June 15, 1935, Serial No. 26,771

1 Claim. (Cl. 285—40)

The present invention relates to a tap and more particularly to a tapping device which may be removably applied to a beer barrel or the like for the purpose of securing a draw-off tube to the barrel.

An object of the present invention is to provide an improved type of tapping device for use on beer barrels whereby the device may be applied to and removed from a barrel without interference with the chime of the barrel.

Another object of the present invention is to provide a tapping device for use with a beer barrel including a connecting sleeve which is joined to the tapping device in connected relation at a point beyond the chime of the barrel, to rigidify the tap and its support draft tube more firmly in the barrel.

The above other and further objects will be apparent from the following description and accompanying drawing.

The accompanying drawing illustrates a tapping device embodying the principles of the present invention, and the views thereof are as follows:

Figure 1 is a view in axial section through a tapping device constructed in accordance with the principles of the present invention showing it applied to a tap bush in a metal barrel.

Figure 2 is a sectional view taken substantially in the plane indicated by line II—II of Figure 3, and Figure 3 is a view partially in section and partially in plan, taken substantially in the plane indicated by line III—III of Figure 1.

The drawing will now be explained.

A fragmental portion of a conventional metal barrel A has the usual head 1 and a chime 2 which, in accordance with present methods of construction projects beyond the head 1.

Welded in an aperture in the head 1 is a tap bush B of known form which includes a neck 23 at the extremity of which are the usual overhanging flanges 3, which are notched, to receive cooperating lugs on the tapping device.

The tapping device of the present invention includes a body 4, which is hollow to receive a draft tube C and which body has formed as an integral part thereof an enlargement 5 at its outer end providing an inclined face 6 for a tube washer 7, which enlargement is threaded on its exterior to receive an interiorly threaded cap nut 8. The nut 8 is provided with a presser bushing 9 adapted to press against the washer 7 and force it into holding engagement with the tube C when the nut 8 is moved in one direction on the body 4. The presser bushing 9 is relatively rotatably mounted within the tap nut 8 so that as the nut is rotated the bushing moves axially, without rotation, and thus prevents abrasion of the washer 7.

The other extremity of the body 4 is provided with a reduced cylindrical end 10 adapted to enter the central opening in the neck 23 of the tap bush and also to receive a sealing washer 11 which engages against the outer surfaces of the flanges 3 of the tap bush, when the tapping device is applied to the bush. The adjacent portion of the body 4 is provided with shoulders 12 which bear against the adjacent surface of the washer 11 to press it into sealing engagement with the bush as will be later explained.

A connecting sleeve 13 surrounds the inner end of the body 4 and is provided at its inner end with lugs 24 to engage the under surfaces of the flanges 3 of the tap bush to cooperate with the inner end of the tap bush body 4 in securing the tapping device to the bush. The connecting sleeve 13 is in axial length, considerable so that it extends beyond the chime 2 of the barrel a sufficient distance to permit manipulation of the connecting ring 14 for securing the tapping device to the bush.

The connecting ring 14 is rotatably arranged within the body 4 by means of a flanged portion 15 entering an annular recess 16 formed in the tap bush. Wings 17 are formed as a part of the ring 14 to facilitate its manipulation and these wings are inclined to the axis of the body in a direction divergent from the connecting sleeve 13. Preferably, the ring 14 and the wings 17 are made as counterparts as may be observed in Figure 3, which parts are secured together by means of rivets 18 when the counterparts are assembled on the body 4 of the device.

Formed as an integral part of the body 4 of the tapping device is a laterally extending connection 19 for an air pressure hose. This connection is preferably inclined to the axis of the body 4 in the same general direction as the inclination of the wings 17 of the ring 14 so that these parts may be maintained in close proximity and at the same time enable ready rotative movement of the ring for attaching the tapping device to a tap bush or removing it from the bush.

The arrangement of the parts is such for the purpose of maintaining the over-all length of the tapping device within reasonable limits, as certain elements of such a device are necessary for its proper functioning. It would be possible to provide an elongated tapping device where the air hose connection 19 were other than inclined as shown, but this would necessitate a tapping device of greater length than that shown in the drawing which, for some reason is not as satisfactory to the trade as one which is no longer than necessary to secure the necessary elements in such a device.

The connecting sleeve 13 and the enclosed portion of the body 4 are provided with inter-engaging means to prevent rotative movement of the sleeve with respect to the body. The arrangement chosen for effecting this end, in the present instance, includes diametrically arranged ribs 20 on the closed portion of the body 4, and grooves 21 formed in the interior of the sleeve 13 as may be observed in Figure 2. Such a construction enables axial relative movement between the sleeve 13 and the tap body but prevents relative rotative movement between them.

In applying a tapping device of the present invention to a barrel, the draft tube C is removed from the tapping device. The connecting ring 14 is loosened so that the connecting sleeve 13 is free to engage over the flanges 3 of the tap bush whereupon the tapping device is rotated until the lugs 24 on the sleeve 13 contact the usual stops present in such a tap bush. Thereupon the wings 17 of the connecting ring 14 are rotated which causes relative axial movement between the body 4 and the sleeve 13 to tighten the tapping device against the bush in operative relationship.

The draft tube C is next inserted with the nut 8 loosened and forced downwardly to dislodge the usual plug present in the tap bush and moved down until the lower end of the draft tube engages the bottom of the barrel whereupon the nut 8 is tightened to force the washer 7 into gripping engagement with the tube whereupon the tapping device is ready for use.

In the event that pressure is required within the barrel to discharge its contents, air or gas under pressure is admitted through the connection 19 as is common practice, sufficient for the purpose intended.

It will be observed that the construction of the tapping device of the present invention provides sufficient space between the chime 2 of the barrel and the manipulating wings of the ring 14 to enable ready application of the tapping device to a barrel or its removal therefrom without interference from the chime.

Another advantage gained by the construction of the present tapping device is that the connection of the connecting sleeve 13 to the tap body 4 is at a point remote from the bush and outwardly of the chime 2 thus increasing the lever arm effect present which has been found to rigidify the tapping device to a greater extent than is possible with such tapping devices wherein the connecting sleeve is short and the connecting ring is closely adjacent the bush, when the tapping device is applied to a barrel.

Oftentimes beer barrels are tapped while lying on their sides and consequently whenever the faucet forming a part of the draft tube C is utilized, the user unconsciously exerts pressure against the tube and unless the tapping device is securely fastened to the bush leakage may occur, resulting in loss of the beer as well as admission of excessive air to the interior of the barrel with the possibility of thus affecting the quality of its contents.

The construction of the tapping device of the present invention with the long lever arm effect between the connecting sleeve 13 and the body 4 being outwardly of the chime 2 rigidifies the tapping device to a point where such accidental side play is impossible.

The cap nut 8 is provided with suitable lugs 22 or like handle means for convenience in manipulation.

The invention has been described herein more or less precisely as to details, yet it is to be understood that the invention is not to be limited thereby, as changes may be made in the arrangement and proportion of parts, and equivalents may be substituted, without departing from the spirit and scope of the invention.

The invention is claimed as follows:

A tapping device for use with a barrel having a flanged bush, said device comprising an elongated hollow body having means near the upper end thereof defining a passaged neck for a hose connection, an elongated sleeve having lugs at its lower end to engage the under side of the flange of the bush, said sleeve extending upwardly about said hollow body to approximately the point where said neck extends from said hollow body, and means carried by said hollow body and engaging said sleeve at its upper end for drawing said sleeve into clamping engagement with said bush.

FRANK E. RICE.